(12) United States Patent
Lee

(10) Patent No.: US 8,266,379 B2
(45) Date of Patent: Sep. 11, 2012

(54) MULTITHREADED PROCESSOR WITH MULTIPLE CACHES

(75) Inventor: Hee Choul Lee, Cupertino, CA (US)

(73) Assignee: Infineon Technologies AG (DE)

( * ) Notice: Subject to any disclaimer, the term of this patent is extended or adjusted under 35 U.S.C. 154(b) by 920 days.

(21) Appl. No.: 10/453,226

(22) Filed: Jun. 2, 2003

(65) Prior Publication Data

US 2004/0243765 A1    Dec. 2, 2004

(51) Int. Cl.
*G06F 12/06* (2006.01)

(52) U.S. Cl. .................. 711/118; 711/E12.039

(58) Field of Classification Search .............. 711/119, 711/118, 147, 120, 121, 123, 125, 126, E12.039; 712/228; 718/104
See application file for complete search history.

(56) References Cited

U.S. PATENT DOCUMENTS

| | | | | |
|---|---|---|---|---|
| 5,944,816 A * | 8/1999 | Dutton et al. | ............... | 712/215 |
| 5,974,438 A * | 10/1999 | Neufeld | ................ | 711/144 |
| 6,021,470 A * | 2/2000 | Frank et al. | ................ | 711/138 |
| 6,122,712 A * | 9/2000 | Torii | ................ | 711/141 |
| 6,542,991 B1 * | 4/2003 | Joy et al. | ................ | 712/228 |
| 7,516,446 B2 * | 4/2009 | Choi et al. | ................ | 717/128 |
| 7,769,955 B2 * | 8/2010 | Ozer et al. | ................ | 711/138 |
| 7,814,469 B2 * | 10/2010 | Wang et al. | ................ | 717/161 |
| 2003/0028819 A1* | 2/2003 | Chiu et al. | ................ | 714/5 |
| 2003/0093614 A1* | 5/2003 | Kohn et al. | ................ | 711/105 |
| 2003/0191927 A1* | 10/2003 | Joy et al. | ................ | 712/228 |
| 2004/0045010 A1* | 3/2004 | Kondo et al. | ................ | 719/316 |
| 2004/0103248 A1* | 5/2004 | Hass et al. | ................ | 711/117 |

* cited by examiner

*Primary Examiner* — Pierre-Michel Bataille
(74) *Attorney, Agent, or Firm* — Dickstein Shapiro LLP

(57) ABSTRACT

A multithreaded processor includes multiple level-1 program caches and multiple level-1 data caches to decrease the likelihood of cache misses after thread switches. By using multiple level-1 caches, execution of a first thread does not cause instructions or data cached for a second thread to be replaced. Thus, when the second thread is being executed the occurrence of cache misses is reduced.

12 Claims, 6 Drawing Sheets

MULTITHREADED PROCESSOR WITH MULTIPLE CACHES

FIELD OF THE INVENTION

The present invention relates to microprocessor systems, and more particularly to efficient cache systems for multi-threaded processors.

BACKGROUND OF THE INVENTION

FIG. 1 illustrates a conventional processors system 100 having a processing core 110, a program cache 120, a data cache 130, a system bus 140, and main memory 150. Processing core 110 is coupled to program cache 120 and data cache 130. System bus 140 couples program cache 120 and data cache 130 to main memory 150. Program cache 120, data cache 130, and main memory 150 work together as a memory system for processing core 110. Program cache 120 stores recently used program instructions, which are likely to be used again. Similarly, data cache 130 stores recently used data that are likely to be used again.

In general, data cache 120 and program cache 130 are made with faster and more expensive memory circuits than main memory 150. However, main memory 150 holds far more data and program instructions than data cache 120 and program cache 130. Program cache 120 and data Cache 130 improve the overall performance of the memory system when the data or instructions needed by processing core 110 are located in the caches. The term "cache hit" is typically used to describe the situation where the accessed data or instruction is located in a cache. Conversely, the term "cache miss" is used to describe the situation where the accessed data or instruction is not located in a cache. On data reads, when data requested by processing core 110 is not located in data cache 130 (i.e. a cache miss), the required data must be retrieved from main memory 150. Generally, when the data from a cache miss is retrieved, it replaces some data in the data cache that has not been recently used. Because main memory is much slower than data cache 130, processing core 110 is usually stalled by a cache miss. Thus, processing cycles are often wasted during cache misses.

In multithreaded processors, the processor holds the state of several active threads, which can be executed independently. When one of the threads becomes blocked, for example due to a cache miss, another thread can be executed so that processor cycles are not wasted. Threads may also be switched for other reasons, such as balancing processing cycles between threads, interrupts, and traps.

However, different threads generally use different parts of main memory 150. Thus, the data in data cache 130 for a first thread may be replaced while processing core 110 is executing a second thread. Similarly, program instructions in program cache 120 for a first thread may be replaced, while processing core 110 is executing a second thread. When processing core 110 again executes the first thread, the benefits of program cache 120 and data cache 130 may be lost because the caches no longer contain the data and program instructions of the first thread.

Hence there is a need for a caching method or system to provide efficient caching for multithreaded processors.

SUMMARY

Accordingly, a multithreaded processor in accordance with the present invention includes a plurality of level-1 caches that can be used by different threads so that execution of a second thread does not cause the cached data from a first thread to be replaced. Furthermore, when a thread switch from a first thread to a second thread is caused by a cache miss in the first thread, the second thread can execute using one cache while the requested data of the first thread is loaded into another cache.

In one embodiment of the present invention, a cache system is used in a multithreaded processor having a processing core and a plurality of active threads. The cache system includes a first thread micro-cache coupled to the processing core and a second thread micro-cache coupled the processing core. The first thread micro-cache is assigned to a first active thread and the second thread micro-cache is assigned to a second active thread. Thus, when the first active thread is executing the first thread micro-cache is used, and when the second active thread is executing the second thread micro-cache is used. The Cache system can also include a level-2 cache coupled to the first thread micro-cache and the second thread micro cache. Some embodiments of the present invention also includes a global micro-cache.

The present invention will be more fully understood in view of the following description and drawings.

DETAILED DESCRIPTION

As explained above, conventional cache systems are not well suited for multithreaded processors. Specifically, data and program instructions for a first thread may be replaced while the processing core is executing a second thread. Thus, when the processing core returns to the first thread, execution of the first thread is hampered due to cache misses. The present invention uses a plurality of level-1 caches that can be assigned to different threads so that execution of a second thread does not replaced data or program instructions of a first thread. Level-1 caches are also referred to as micro-caches.

Figure 2:
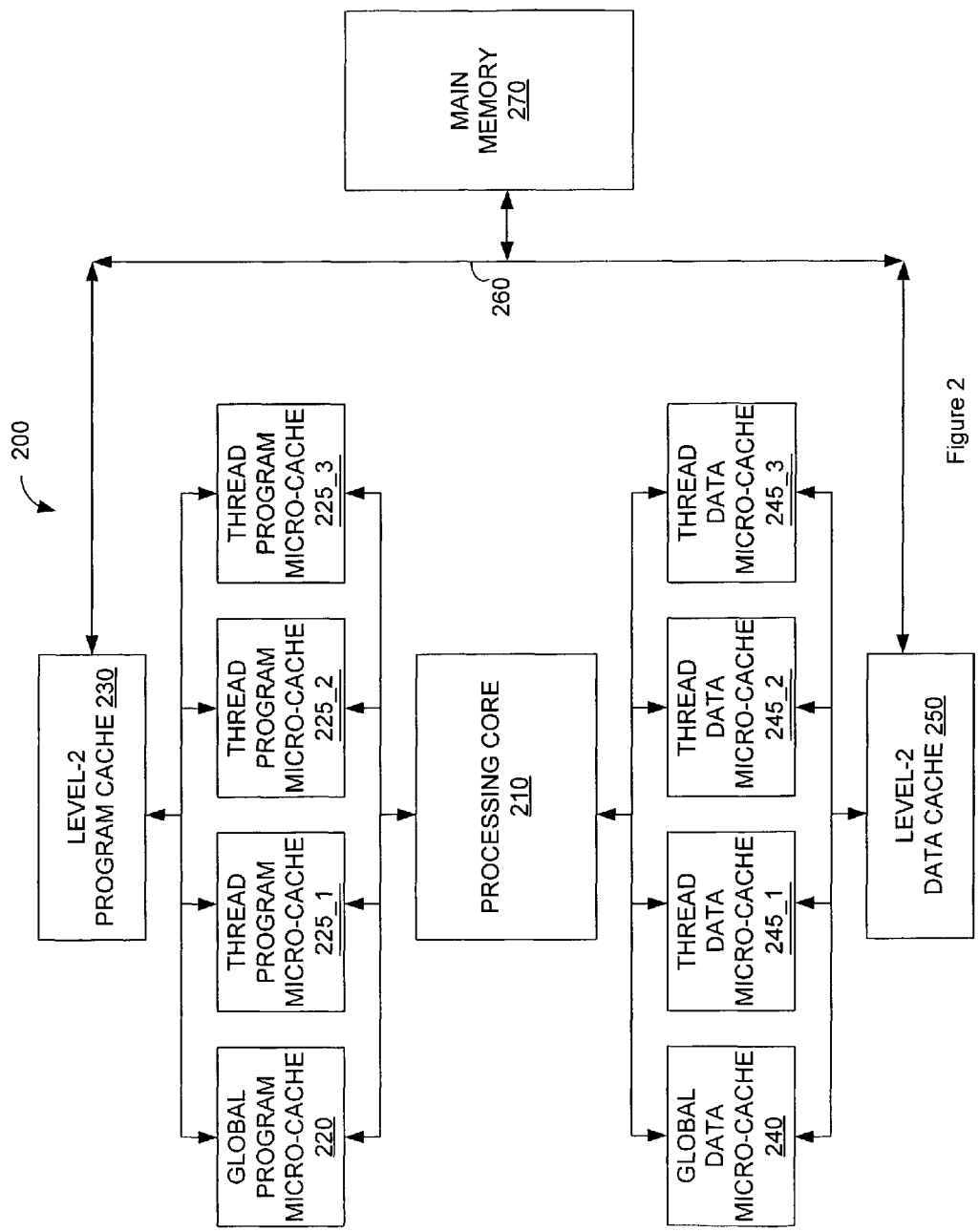
FIG. 2 is simplified block diagram of a processor system in accordance with one embodiment of the present invention.

FIG. 2 is a simplified block diagram of a processor system 200 in accordance with one embodiment of the present invention. Processor system 200 includes a processing core 210, a global program micro-cache 220, thread program micro-caches 225_1, 225_2, and 225_3, a level 2 program cache 230, a global data micro-cache 240, thread data micro-caches 245_1, 245_2, 245_3, a level 2 data cache 250, a system bus 260, and main memory 270. Processing Core 210 is coupled to global program micro-cache 220, thread program micro-caches 225_1, 225_2, and 225_3, global data micro-cache 240, and thread data micro-caches caches 245_1, 245_2, and 245_3. Other embodiments of the present invention may use a different number of program micro-caches and a different number of data micro-caches. Generally, threads are assigned to different thread data micro-caches so that execution of a first thread does not cause data for a second thread to be replaced. Similarly, threads are assigned to different thread program micro-caches so that execution of a first thread does not cause program instructions for a second thread to be replaced.

Global program micro-cache 220, and thread program micro-caches 225_1, 225_2, and 225_3 are coupled to level 2 program cache 230. However, other embodiments of the present invention may use a single cache level or a greater number of cache levels. Multi level caching is well known in the art and thus is not described in detail herein. Generally, multi-level caching creates a hierarchy of memory circuits. The speed of the memory circuits decreases as the level increases. Conversely, the data capacity of the memory circuits increases as the level increases. Level-2 program cache 230 is coupled to main memory 270 through system bus 260. Global data micro-caches 240 and thread data micro-caches 245_1, 245_2, and 245_3 are coupled to level-2 data cache 250. Level-2 data cache 250 is coupled to main memory 270 through system bus 260.

Figure 3:
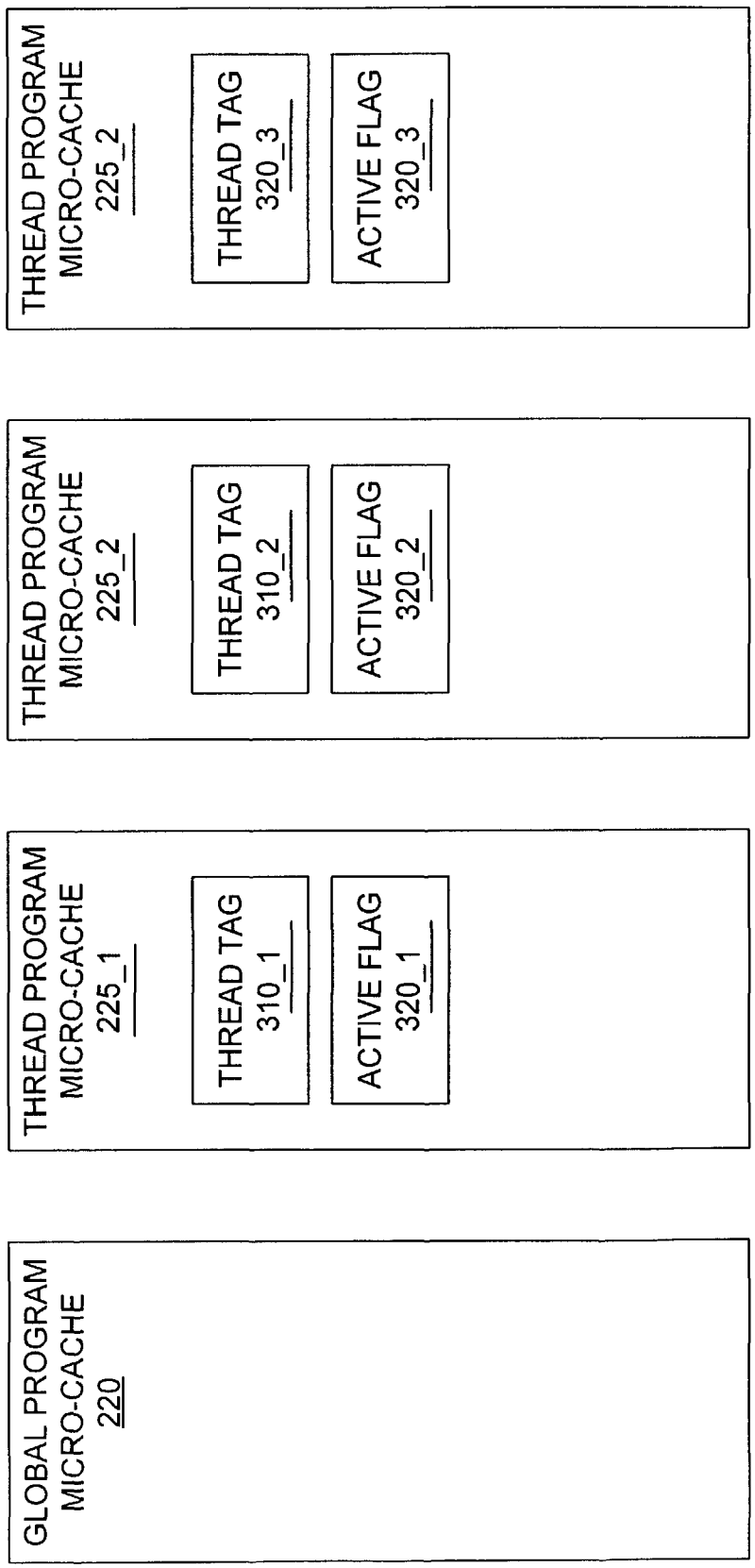
FIG. 3 is a block diagram of a program cache system in accordance with one embodiment of the present invention.

FIG. 3 illustrates the use of multiple program micro-caches in accordance with one embodiment of the present invention. As explained above, when multiple threads share a single program cache, program instructions in the program cache for a first thread may be replaced while the processing core is executing a second thread. In accordance with the principles of the present invention multiple program micro-caches are used simultaneously to reduce the replacement of program instructions in multithreaded processors. Multithreaded processors generally switch execution between a limited number of "active threads." In some embodiments of the present invention, a processor system would include a thread program micro-cache for each active thread. However, for embodiments of the present invention that support a large number of active threads, the plurality of thread program micro-caches can be shared.

Because some program instructions are used by many threads, the embodiment of FIG. 3 includes a global program micro-cache. For example, BIOS (basic input/output system) instructions are likely to be used in many threads. In operation if both a first thread and a second thread use the same instructions, it is less likely that instructions needed by the first thread is replaced while processing core 210 is executing the second thread. Generally, program instructions that are to use the global program cache are preconfigured in the processing system. For clarity, the term "global instructions" is used herein to describe the set of program instructions that are cached in the global program micro-cache.

Each thread is assigned to one thread program micro-cache. Some embodiments of the present invention can assign multiple threads to a single thread program micro-cache. Each thread program micro-cache includes a thread tag and an active flag. Specifically as illustrated in FIG. 3, thread program micro-cache 225_N, includes thread tag 310_N and active flag 320_N, where N is an integer from 1 to 3, inclusive.

Figure 4:
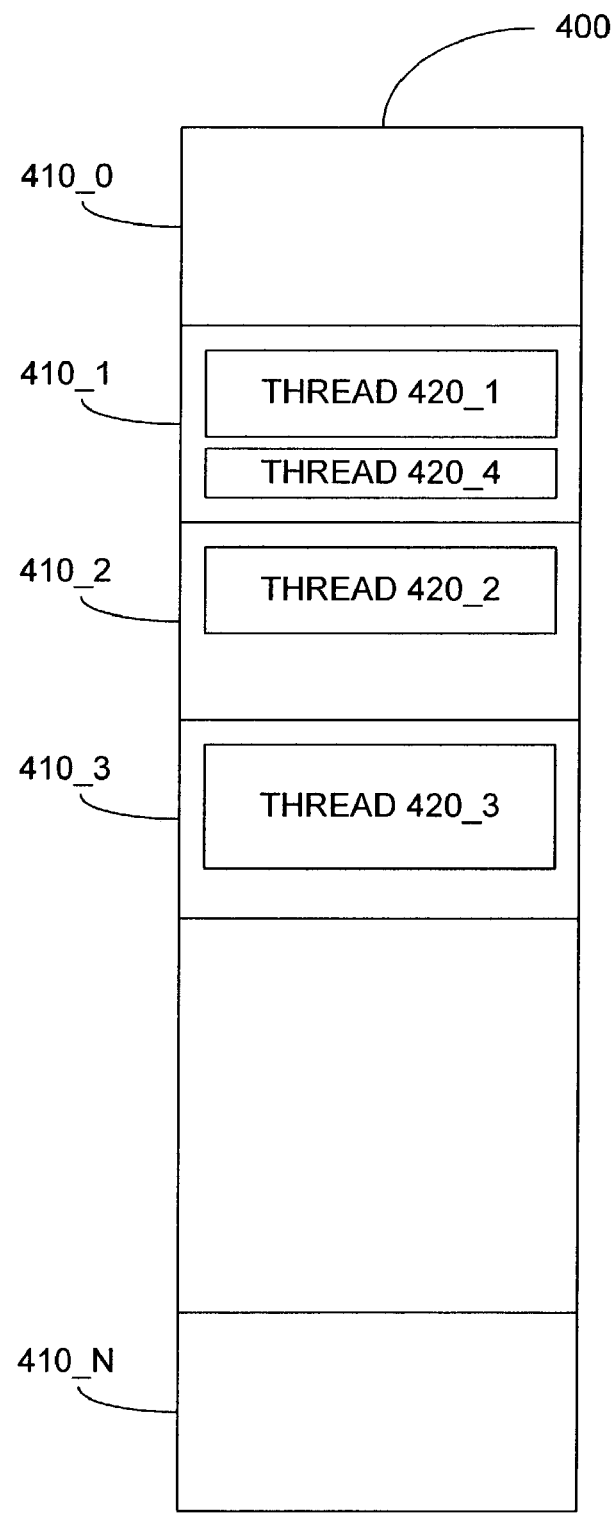
FIG. 4 is a simplified illustration of the organization of memory in a processor system in accordance with one embodiment of the present invention.

In one embodiment of the present invention, segmentation of the memory space of processor system 200 is used to assign threads to thread program micro-caches. As illustrated in FIG. 4, memory space 400 is divided into a plurality of memory segments 410_0, 410_1, 410_2, 410_3, . . . 410_N. All memory address of all memory locations in a memory segment share the same R upper bits. A thread program micro-cache can be assigned one of the memory segments. Each thread is assigned to a memory segment and thus assigned to a thread program micro-cache. As illustrated in FIG. 4, thread 420_1 and thread 420_4 are in memory segment 410_1 and would thus share whichever thread program micro-cache is assigned memory segment 410_1 as explained below. Thread 420_2 and thread 420_3 are assigned to memory segment 410_2 and 410_3, respectively.

Figure 5:
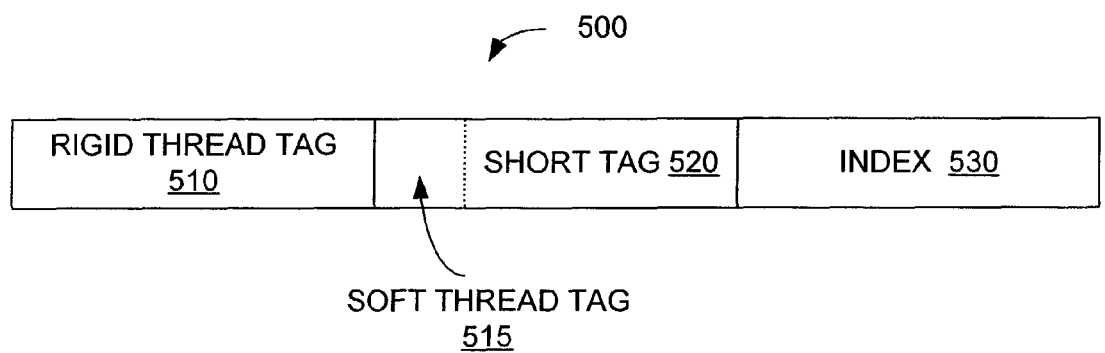
FIG. 5 is an illustration of the memory address in accordance with one embodiment of the present invention.

When a memory segment is assigned to a thread program micro-cache, the thread tag of the thread program micro-cache is set equal to the upper R bits of the memory segment. FIG. 5 illustrates a memory address 500 of a memory location as it relates to addressing thread program micro-caches. Memory address 500 is divided into a rigid thread tag 510, a short tag 520, and an index 530. Short tag 520 also includes a soft thread tag 515. Rigid thread tag 510 includes the first R bits of memory address 510, The number of bits in index 530 depends on the size and configuration of the thread program micro-caches. Short tag 520 contains the remaining bits of memory address 500. Soft thread tag 515 is conceptually used to distinguish between multiple threads that may be sharing a thread program micro-cache. For example, in one embodiment of the present invention, a 32 Kilobyte 4-way set associative cache system has 1024 cache way (line) that are 32 bytes each. Thus, there are 256 sets which requires an 8 bit set index within index 530. Furthermore, index 530 also must determine wherein the 32 KB cache line the requested memory begins. To reduce the tag area of the thread program micro-caches, only the short tag portion of an address is required to access the thread program micro-cache because all threads using a particular thread program micro-cache have the same rigid thread tag. Because the global program cache is used by all the threads, a full tag must be used when accessing the global program cache. The full tag includes the rigid thread tag and the short tag.

When processing system 200 is first activated, all the thread tags in the thread program micro-caches are invalidated and the active flags are set to an inactive state (i.e. logic 0). When a thread begins executing the thread is assigned to a particular thread program micro-cache. The active flag of the selected thread program micro-cache is set to an active state (i.e. logic 1) and rigid thread tag of the thread is written into the thread tag of the selected thread program micro-cache. When an active flag of a thread program micro-cache is in the active state, the thread program micro-cache is referred to as the active thread program micro-cache. Only one of the thread program micro-cache is active at a given time.

For clarity assume thread program micro-cache 225_1 is selected for the first thread. While the first thread is executing, thread program micro-cache 225_1 is the active thread program micro-cache. When a program memory access is performed in the active thread, global program micro-cache 220 and the active thread program micro-cache (i.e. thread program cache 225_1) are both checked to determine if there is a cache hit. If a cache hit occurs then the instruction is accessed in the cache containing determined to have the cache hit.

If a cache miss occurs, the upper R bits of the memory address of the accessed instruction is compared to the thread tag of the active thread program cache. (i.e. thread tag 310_1). If the upper R bits match then the cache miss is handled by the active thread program micro-cache (i.e. thread program micro-cache 225_1). Otherwise, the cache miss is handled by global program micro-cache 220. In some embodiments of the present invention, address matching is handled in parallel with cache access to improve performance.

Figure 1:
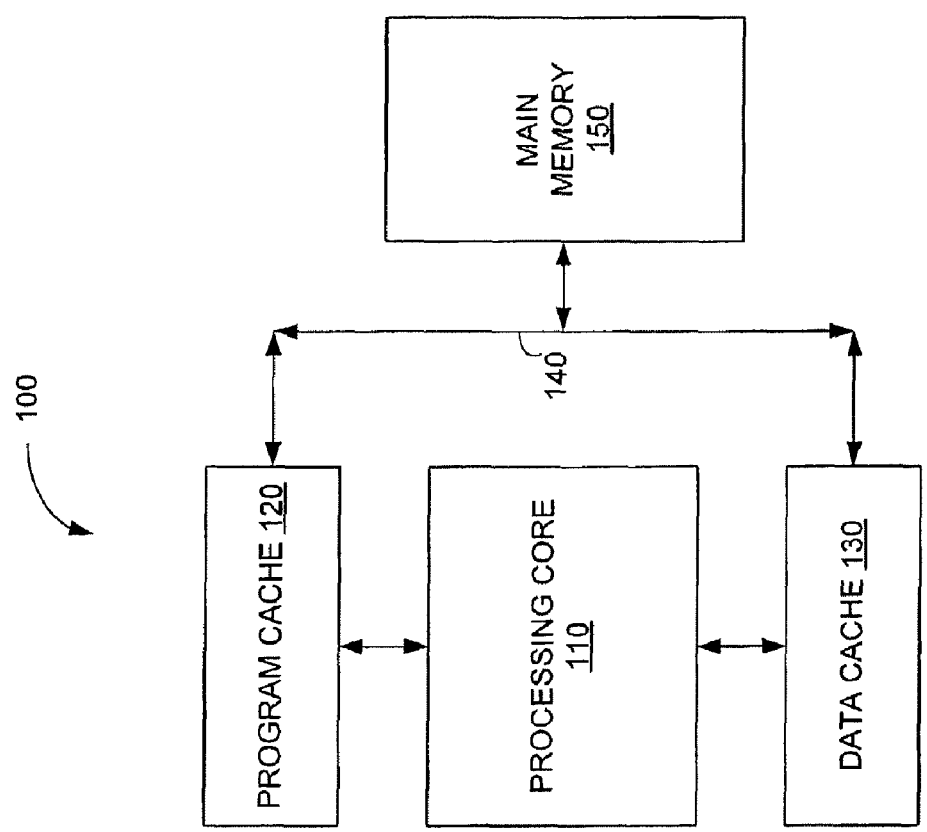
FIG. 1 is simplified block diagram of a conventional processor system.

When a second thread becomes the executing thread and the second thread is assigned to thread program micro-cache 225_2, active flag 320_1 is set to an inactive state, active flag 320_2 is set to the active state, and the rigid thread tag of the second thread is written into thread tag 310_2. By assigning a different thread program micro-cache to the second thread, instructions that are frequently used by the first thread remain available in thread program micro-cache 225_1. Thus, when the first thread against becomes the executing thread, processing system 200 is less likely to have cache misses than conventional processing systems. Therefore, a caching system in accordance with the present invention improves the utilization of the processing core. In some embodiments of the present invention, the appropriate rigid thread tags can be loaded and stored in the appropriate thread tags of the micro-caches at system initialization In some embodiments of the present invention, multiple micro-caches are only used for programs instructions. In these embodiments, standard caching is used for data. For example, a specific embodiment of the present invention uses multiple program micro caches as described above with a single data cache (such as data cache 130 in FIG. 1). In other embodiments of the present invention, each thread program micro-cache has a corresponding thread data micro-cache. The corresponding pairs of thread data micro-cache and thread program micro-cache work in parallel and even they can share a single thread tag and active flag if data-micro-cache and program micro-cache are unified. Other embodiments of the present invention control the thread data micro-caches and thread program micro-caches independently.

Figure 6:
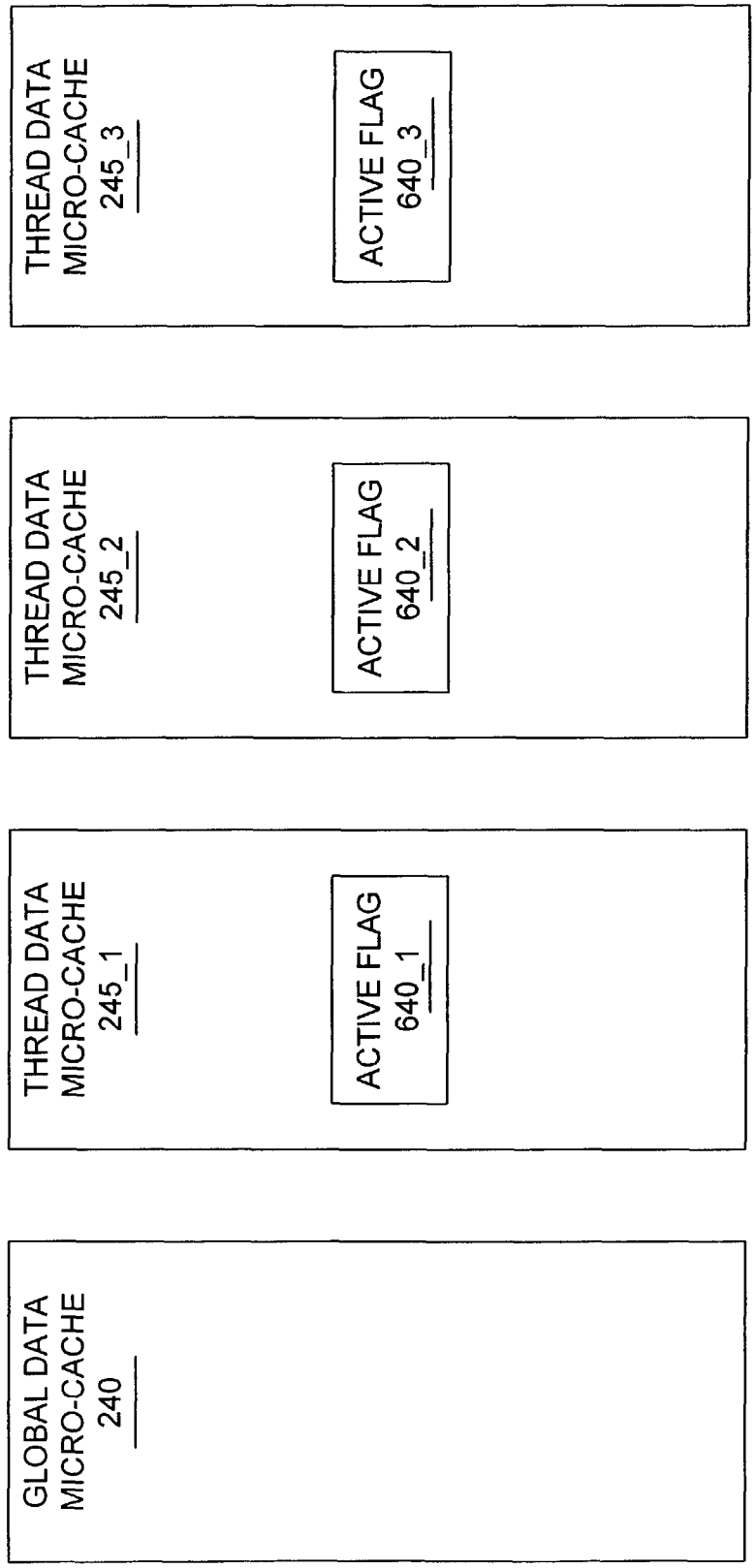
FIG. 6 is a block diagram of a data cache system in accordance with one embodiment of the present invention.

FIG. 6 illustrates the data micro-caches in accordance with another embodiment of the present invention. The thread data micro-caches of FIG. 6 are accessed using full tags because the individual thread data micro-caches do not use thread tags. Thread data micro-caches 245_1, 245_2, and 245_3 have individual active flags 640__1, 640_2, and 640_3, respectively. Only one thread data micro-cache is active at a given time.

When a thread begins execution, a corresponding thread data micro-cache becomes active (i.e. becomes the active thread data micro-cache) and the active flag of the corresponding thread data micro-cache is set to an active state. During a data access, both the global data micro-cache and the active thread data micro cache are accessed simultaneously. If a cache hit occurs the data is accessed in the appropriate micro-cache. However, for a cache miss the active thread data micro-cache resolves the cache miss to avoid duplication of data in the global data micro-cache and the thread data micro-caches. During execution of some global operation threads, no thread data micro-caches are active. For global operation threads, only the global data micro-cache is used. In these embodiments, snooping operations are performed whenever data is stored to insure data coherency between the thread data micro-caches. Specifically, each thread data micro-cache must determine whether the thread data micro-cache contains a copy of the data being stored. All copies of the data being stored, even in inactive thread data micro-caches are updated.

In other embodiments of the present invention, the thread data micro-caches can operate exactly as described above with respect to thread program micro-caches. In these embodiments, the thread data micro-caches would also have thread tags, which would operate as described above with respect to program thread caches.

In the various embodiments of this invention, novel structures and methods have been described to enhance the performance of multi-threaded processors. The various embodiments of the structures and methods of this invention that are described above are illustrative only of the principles of this invention and are not intended to limit the scope of the invention to the particular embodiments described. For example, in view of this disclosure, those skilled in the art can define other level-1 data caches, level-1 program caches, cache hierarchies, memory systems, processing cores, thread program micro-caches, thread data micro-caches, global program micro-caches, global data micro-caches, thread tags, rigid thread tags, short tags, active flags, and so forth, and use these alternative features to create a method or system according to the principles of this invention. Thus, the invention is limited only by the following claims.

What is claimed is:

1. A cache system for a multithreaded processor having a single processing core and a plurality of active threads, the cache system comprising:
a first thread micro-cache directly coupled to the single processing core; and
a second thread micro-cache directly coupled to the single processing core,
wherein the first thread micro-cache is assigned a first active thread and the second thread micro-cache is assigned a second active thread.

2. The cache system of claim 1, further comprising a level-2 cache coupled to the first thread micro-cache and the second thread micro-cache.

3. The cache system of claim 1, further comprising a global micro-cache.

4. The cache system of claim 1, wherein the first thread micro-cache and the second thread micro-cache are thread data micro-caches.

5. The cache system of claim 1, wherein the first thread micro-cache and the second thread micro-cache are thread program micro-caches.

6. The cache system of claim 5, further comprising:
a first thread data micro-cache coupled to the single processing core; and
a second thread data micro-cache coupled to the single processing core.

7. The cache system of claim 6, wherein the first thread data micro-cache and the first thread program micro-cache share a thread tag and a status flag.

8. The cache system of claim 6, further comprising:
a global data micro-cache coupled to the single processing core; and
a global program micro-cache coupled to the single processing core.

9. The cache system of claim 1, further comprising a third thread micro-cache directly coupled to the single processing core, wherein the third thread micro-cache is assigned a third active thread.

10. The cache system of claim 1, wherein the first thread micro-cache is assigned a third active thread.

11. The cache system of claim 1, wherein the first thread micro-cache comprises a thread tag for storing a rigid thread tag.

12. The cache system of claim 1, wherein the first thread micro-cache comprises a status flag.

* * * * *